United States Patent Office 3,272,762
Patented Sept. 13, 1966

3,272,762
PREPARATION OF CELLULAR POLYURETHANES IN THE PRESENCE OF A SILOXANE-OXYALKYLENE COPOLYMER
Arthur Ibbotson and Edward Jervis Vickers, both of Manchester, England, assignors to Imperial Chemical Industries Limited, London, England, a corporation of Great Britain
No Drawing. Filed Oct. 11, 1961, Ser. No. 144,324
Claims priority, application Great Britain, Oct. 19, 1960, 35,823/60; July 6, 1961, 24,470/61
12 Claims. (Cl. 260—2.5)

This invention relates to new polymeric materials, more particularly to new siloxane-oxyalkylene copolymers.

Siloxane-oxyalkylene block copolymers are known to be of value as additives in the preparation of polyurethane foams. It is also known from U.K. specification No. 802,467 to make siloxane-oxyalkylene copolymers in which the polyoxyalkylene chains are attached to silicon atoms through a divalent aliphatic radical.

It has now been found that novel siloxane-oxyalkylene graft copolymers in which the oxyalkylene or polyoxyalkylene groups or chains are attached directly to silicon atoms are very readily accessible by reacting polysiloxanes containing silicon-bonded hydrogen with monohydric alcohols having the general formula:

$$H(OC_nH_{2n})_mR'$$

wherein R' is a radical derived from a compound R'H wherein H is a hydrogen atom reactive with a cyclic oxide, n is an integer of 2 to 4, and m is an integer of at least 1. These new siloxane-oxyalkylene copolymers have been found to be valuable additives in the manufacture of polyurethane foams, in particular by the simultaneous reaction of secondary hydroxy-ended polyethers, organic polyisocyanates and water using the general methods described in the prior art.

Thus according to the present invention there are provided as new compositions of matter siloxane-oxyalkylene copolymers with the general formula:

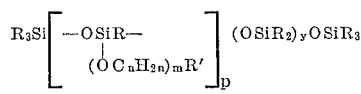

wherein R is a monovalent hydrocarbon radical, R' is a radical derived from a compound R'H wherein H is a hydrogen atom reactive with a cyclic oxide, n is an integer of 2 to 4, m and p are integers of at least 1, and y is an integer of zero or greater.

R may be any monovalent hydrocarbon radical of which examples include alkyl radicals such as methyl, ethyl, propyl, butyl, octyl and octadecyl, cycloalkyl radicals such as cyclohexyl, aryl radicals such as phenyl and tolyl and arylalkyl radicals such as benzyl and phenylethyl radicals.

R' may be for example an alkoxy radical such as methoxy, ethoxy, propoxy, butoxy, octyloxy, octadecyloxy; a cycloalkoxy or arylalkoxy radical such as cyclohexyloxy, benzyloxy; an aryloxy radical such as phenoxy, t-butyl-phenoxy, octylcresoxy; an amine residue such as dimethylamino, diethylamino, phenylmethylamino, morpholino; or a carboxylic acid or amide residue such as benzoyloxy or benzoylmethylamino.

The oxyalkylene residue $OC_nH_{2n}$ may be, for example, oxyethylene, oxypropylene or oxybutylene. The unit $(OC_nH_{2n})_m$, when polymeric, may be a homopolymer or a copolymer containing different oxyalkylene units. Copolymers may be either random copolymers or block copolymers.

In general, it is preferred that R' be an aromatic residue such as aryloxy or arylalkoxy, or an amine residue, or alternatively that m should have a value of at least 2 where R' is an alkoxy group, since therein lie the most valuable compositions. It is especially preferred that OR' be the residue of a polyether obtained by oxyalkylation of the compound R'H. It is also preferred that R should be substantially a lower alkyl, especially methyl, that $p+y$ should have a value of not less than 8 and that the ratio $y/p$ should not substantially exceed 6. The units

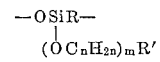

and $$OSiR_2$$

are also preferably randomly disposed along the polysiloxane chain.

According to a further embodiment of the present invention there is provided a process for the manufacture of the siloxane-oxyalkylene copolymers hereinbefore described which comprises reacting a polysiloxane-containing silicon-bonded hydrogen with a monohydric alcohol as hereinbefore defined.

It is preferred to carry out the reaction in the presence of a catalyst of the type described in the prior art as effective in this general type of reaction, for example bases, acids, Friedel-Crafts halides, or metallic salts and complexes.

Particularly active catalysts are strong alkalies, especially alkali metal alkoxides such as sodium or potassium methoxide, or an alkali metal derivative of the monohydric alcohol which it is desired to react. Such alkali metal alkoxide catalysts are not, however, always completely satisfactory. This is particularly apparent when making block copolymers from hydrophilic polyethers of high molecular weight of the order of 1500 or higher. In such cases it is difficult, if not impossible, to obtain a homogeneous, single-phase product by the use of an alkoxide catalyst, and the mixture of products so obtained is usually ineffective as a surface-active additive for making polyurethane foams. It has been found, surprisingly, that these difficulties may be avoided by using as catalysts certain metal salts, especially metal salts which are soluble in the reaction medium, such as carboxylic acid salts of divalent tin or lead, or of dialkyl tin. Examples of particularly suitable catalysts are stannous octoate, lead octoate and dibutyl tin dilaurate. The use of these preferred catalysts enables the preparation, without difficulty, of homogeneous condensates which are extremely active as surface-active additives for the manufature of polyurethane foams. Furthermore, even in those cases where it is possible to make a homogeneous product by use of an alkoxide catalyst, it is frequently found that the use of the aforedescribed metal salt catalysts provides products which are more active, or more reproducible in their properties as additives for polyurethane foams, than similar compositions made with an alkoxide catalyst.

The catalysts are normally used in proportions of from 0.05 to 1.0% by weight of the total weight of reactants, although proportions outside this range may be used. The amount of catalyst is preferably kept to the minimum consistent with an acceptable rate of reaction, since in this way products with the highest order of activity are obtained.

The reaction is normally carried out at temperatures from 20° to 140° C., depending mainly on the catalyst used. It is usually convenient to carry out the reaction in a solvent, for example an aromatic hydrocarbon or a chlorinated aromatic hydrocarbon.

Examples of polysiloxanes containing silicon-bonded hydrogen which may be used in the process of this invention include linear methyl polysiloxanes having the general formula

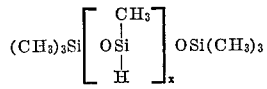

where $x$ is preferably at least 8 and may have a value of the order of 60 or even higher, or linear polysiloxanes consisting of random copolymers having the general formula

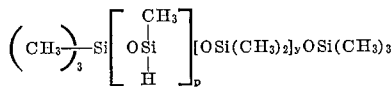

where preferably $p$ is at least 3, $p+y$ is at least 8 and $y/p$ may have a value up to 6. Specific polymers and copolymers which have given particularly valuable condensates include those of the first type where $x=8$, 13, 18, 38 or 55, and of the second type where $p=9$ and $y=9$, $p=3$ and $y=5$, $p=6$ and $y=12$, $p=6$ and $y=22$, or $p=3$ and $y=15$.

Other polysiloxanes containing silicon-bonded hydrogen which are suitable for use in the present invention include phenyl methyl polysiloxanes having the following structures:

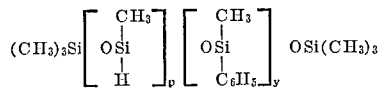

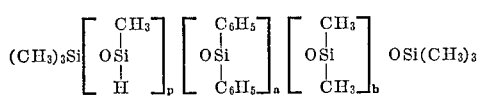

The polysiloxanes containing silicon-bonded hydrogen may be prepared by known methods, by cohydrolysis or equilibration processes from appropriate intermediates.

Examples of monohydric alcohols which may be used in the process of this invention include simple alcohols, for example ether alcohols such as the monomethyl, ethyl, butyl or phenyl esters of ethylene, diethylene, triethylene or propolyene glycols; aminoalcohols such as the N:N dimethyl, diethyl, phenylmethyl or phenylethyl derivatives of ethanolamine or isopropanolamine, or N-hydroxyethylmorpholine; or hydroxyalkyl esters and amides such as 2-hydroxyethyl benzoate, N-acetyl-N-methyl ethanolamine or N-benzoyl-N-methyl ethanolamine. Examples of monohydric polyether alcohols, which are in general mixtures of products of different molecular weights, include the product of oxyalkylation with ethylene, propylene and butylene oxides or with mixtures thereof, of monohydric alcohols or phenols, secondary amines, carboxylic acids and mono-N-substituted carboxylic amides. Some specific examples of such monohydric polyether alcohols which have been found of value are listed in the following table:

| Initiator | Alkylene Oxide | Molecular Weights of Derived Polyethers |
|---|---|---|
| Methanol | Ethylene oxide | 365, 528, 750. |
| Mixed hexadecyl and octadecyl alcohols. | ----do---- | 368.6. |
| Octyl cresol | ----do---- | 586.4. |
| Methyl Cellosolve | Propylene oxide | 354, 708. |
| Isooctanol (mixed isomers). | ----do---- | 292.4, 372, 419, 629, 980. |
| Triethylene glycol monomethyl ether. | ----do---- | 698, 1542. |
| Benzyl alcohol | ----do---- | 410. |
| Isooctanol (mixed isomers). | Butylene oxide (mixed isomers). | 281. |
| Methyl Cellosolve | ----do---- | 390. |
| n-Butanol | Mixture of ethylene and propylene oxides (1:1 by weight). | 332.7, 717, 1510, 2255. |
| Isooctanol (mixed isomers). | ----do---- | 600, 1023, 1529, 1987. |
| Ethyl Carbitol | ----do---- | 1023, 1510, 2010. |
| Butyl Cellosolve | ----do---- | 1483. |
| Butyl Carbitol | ----do---- | 698. |
| Benzyl alcohol | ----do---- | 406. |
| N:N-diethylaminoethanol. | ----do---- | 624, 1135, 1501. |
| Isooctanol (mixed isomers). | Mixture of ethylene and propylene oxides (1:2 by weight). | 1493. |
| Ethyl Carbitol | | 1533. |
| Isooctanol (mixed isomers). | Mixture of ethylene and propylene oxides (2:1 by weight). | 1541. |
| Ethyl Carbitol | | 1509. |

Generally the weight ratio of the total oxyalkylene groups to the polysiloxane block varies between about 0.5 and 10, depending on the properties and structure of the components and the properties desired in the copolymer.

The polysiloxane and the monohydric alcohol are normally in approximately stoichiometric amounts and preferably with a slight excess of up to 3% by weight of the polyether alcohol.

In order to avoid the production of undesirable byproducts, it has been found advantageous to dry the monohydric alcohol and the solvent before use.

The siloxane-oxyalkyene copolymers of the present application when used as additives in the manufacture of polyurethane foams, confer an exceptional degree of stability on the foaming mass prior to the cure of the foam. Thus the use of such additives enables low density foams of high resilience with an excellent pore structure to be obtained.

The polyurethane foams which are advantageously prepared in the presence of the siloxane-oxyalkylene copolymers described in the present application may be prepared from the foam-forming ingredients fully described in the prior art. Thus they may be prepared by the reaction of hydroxyl group-containing polymers such as polyesters, polyesteramides and polyethers containing at least two isocyanate-reative groups per molecule with organic polyisocyanates and water and/or a low boiling point liquid. Such polyurethane products may be prepared for example from materials fully described in the prior art, in the form of surface coatings, sheets, shaped articles or adhesive layers. Thus the hydroxyl group-containing polymer may be for example a polyester, polyesteramide or polyether, or mixtures thereof.

The polyesters or polyesteramides may be made for example from dicarboxylic acids and polyhydric alcohols and, as necessary, minor proportions of diamines or aminoalcohols. Suitable dicarboxylic acids include succinic, glutaric, adipic, suberic, azelaic, and sebacic acids as well as aromatic acids such as phthalic, isophthalic and terephthalic acids. Mixtures of acids may be used. Examples of polyhydric alcohols include glycols such as ethylene glycol, 1:2-propylene glycol, 1:3-butylene glycol, 2:3-butylene glycol, diethylene glycol, tetramethylene glycol, pentamethylene glycol, hexamethylene glycol, decamethylene glycol, and 2:2-dimethyltrimethylene glycol. Other polyhydric alcohols containing more than two hydroxyl groups per molecule may be used, for example trimethylolpropane, trimethylolethane, pentaerythritol and glycerol. Such compounds are included in varying amounts according to the desired rigidity of the products.

In addition to the polyhydric alcohols and dicarboxylic acids there may also be reacted compounds containing more than two groups selected from hydroxyl, carboxyl and secondary and primary amino groups, of which examples include diethanolamine, trimesic acid, dihydroxystearic acid and tricarballylic acid.

Examples of diamines and aminoalcohols that may be used to make polyesteramides include ethylene diamine, hexamethylene diamine, monoethanolamine, phenylene diamines and benzidine.

The polyesters and polyesteramides used according to the process of the present invention normally have molecular weights of from 200 to 5000, with predominantly hydroxyl end groups.

As examples of polyethers for use in the process of the present invention there may be mentioned hydroxyl-ended polymers and copolymers of cyclic oxides, for example 1:2-alkylene oxides such as ethylene oxide, epichlorhydrin, 1:2-propylene oxide, 1:2-butylene oxide and 2:3-butylene oxide, oxacyclobutane and substituted oxacyclobutanes, and tetrahydrofuran. Such polethers may be linear polyether glycols as are prepared, for example, by the polymerisation of an alkylene oxide in the presence of a basic catalyst, such as potassium hydroxide, and a glycol or a primary monoamine. Alternatively there may be used branched polyethers prepared for example by the polymerisation of an alkylene oxide in the presence of a basic catalyst and a substance having more than two active hydrogen atoms per molecule, for example ammonia and polyhydroxy compounds such as glycerol, hexanetriols, trimethylolethane, triethanolamine, pentaerythritol, sorbitol, sucrose and phenol-formaldehyde reaction products, aminoalcohols such as monoethanolamine and diethanolamine and polyamines such as ethylene diamine, hexamethylenediamine, diethylene triamine, tolylene diamine and diaminodiphenylmethane. Branched poylethers may also be produced by copolymerising a cyclic oxide of the type already mentioned with cyclic oxides having a functionality greater than two, for example diepoxides, glycidol and 3-hydroxymethyloxacyclobutanes.

The polyethers used according to the process of the present invention normally have molecular weights of from 200 to 6000. Mixtures of linear and branched polyethers may be used if desired.

Examples of suitable polyisocyanates include aliphatic diisocyanates such as hexamethylene diisocyanate, aromatic diisocyanates such as tolylene-2:4-diisocyanate, tolylene-2:6 - diisocyanate, diphenylmethane - 4:4' - diisocyanate, 3-methyldiphenylmethane-4:4'-diisocyanate, m- and p-phenylene diisocyanate, chlorophenylene 2:4-diisocyanate, naphthalene-1:5-diisocyanate, diphenyl-4:4' - diisocyanate, 4:4' - diisocyanato-3:3' dimethyldiphenyl and diphenyl ether diisocyanate and cycloaliphatic diisocyanates such as dicyclohexylmethane diisocyanate. Triisocyanates which may be used include aromatic triisocyanates such as 2:4:6-triisocyanatotoluene and 2:4:4'-triisocyanatodiphenyl ether. Examples of other suitable organic polyisocyanates comprise the reaction products of an excess of a diisocyanate with polyhydric alcohols such as trimethylolpropane and uretedione dimers and isocyanurate polymers of diisocyanates for example of tolylene-2:4-diisocyanate. Mixtures of polyisocyanates may be used. Examples of suitable mixtures include the polyisocyanate compositions obtained by the phosgenation of the mixed polyamine reaction products of formaldehyde and aromatic amines such as aniline and orthotoluidine.

Suitable low-boiling point liquids that are chemically inert towards isocyanates and water and have boiling points not exceeding 75°C, preferably between —40°C. and 50°C include for example fluorinated alkanes such as monofluorotrichloromethane, dibromo - difluoromethane, 1:1:2 - trichloro-1:2:2 - trifluoroethane, dichlorodifluomethane, dichloromonofluoromethane, dichlorotetrafluoroethane, monochlorodifluoromethane and difluoroethyl bromide or mixtures thereof.

Mixtures of these low boiling liquids one with another and/or with non-fluorine-containing substituted or unsubstituted hydrocarbons, may also be used.

Such liquids are usually employed in amounts of from 1% to 200%, preferably from 50% to 125% by weight of the hydroxylic polymer.

Water is usually employed in amounts of from 1 to 10% by weight of the hydroxyl group-containing polymer, when this is used as the source of carbon dioxide blowing gas.

The preparation of the foamed, cellular polyurethanes may be carried out by the general methods fully described in the prior art. Thus the materials may be mixed continuously or discontinuously and the hydroxyl group-containing polymer may be first reacted with part or the whole of the organic polyisocyanate before the final reaction to give a foam is carried out in a second stage. However it is generally preferred to carry out the foam preparation in one stage only, by the simultaneous reaction of the foam-forming ingredients, namely the hydroxyl group-containing polymer, the organic polyisocyanate and the water and/or the low boiling point liquid. This convenient one-stage process cannot be satisfactorily carried out with all hydroxyl group-containing polymers. In particular those polymers containing predominantly secondary hydroxyl end-groups do not normally give satisfactory foams using a one-stage process as defined above: using such polymers the foam-forming mass usually partially or wholly collapses with considerable loss of gas and the formation of unsatisfactory high density products. The one-stage process gives particularly unsatisfactory results using polyethers having predominantly secondary hydroxyl end groups.

It has been found that the siloxane oxyalkylene copolymers of the present application are especially valuable as foam-stabilising agents in the preparation of foams by the one-stage process from polyethers having predominantly secondary hydroxyl end-groups.

Examples of secondary hydroxyl-ended polyethers include polymers and copolymers of 1:2-alkylene oxides such as propylene and butylene oxides. It is preferred to use predominantly secondary hydroxyl-ended polymers of propylene oxide, especially those with molecular weights of from 400 to 6000.

The siloxane-oxyalkylene copolymers may be incorporated into the foam-forming mixture as such, or may first be mixed with any of the foam-forming ingredients to which they are not reactive, for example the hydroxyl group-containing polymer or the water, and then added to the other foam-forming ingredients. The siloxane-oxyalkylene copolymers are normally incorporated in amounts of from 0.1% to 5%, preferably from 0.3% to 1% by weight of the weight of hydroxyl group-containing polymer, when used in making "one-shot" foams, that is foams made in one stage by the simultaneous reaction of hydroxyl group-containing polymer, polyisocyanate and water.

As described fully in the prior art polyurethane foams may be prepared using a variety of additives including in particular catalysts such as basic materials, for example tertiary amines, and soluble organic compounds of heavy metals, for example iron and manganese acetyl acetonate, dibutyl tin dilaurate and stannous octoate: mixtures of catalysts may often be used with advantage. Other additives include surface-active agents, for example oxyethylated phenols, fatty alcohols such as oleyl alcohol or sulphated methyl oleate, and alkyl or aryl polysiloxanes, flame-retardants such as beta-trichlorethyl phosphate and antimony oxide, plasticisers such as tricresyl phosphate and dioctyl phthalate, colouring matters and fillers such as carbon black and silica and colour stabilizers and whitening agents. A further class of additives that may be added comprises antioxidants, for example tert-butyl-catechol and sterically hindered phenols.

The invention is illustrated but not limited by the following examples in which parts and percentages are by weight.

Example 1

67 parts of diethylene glycol monoethyl ether are diluted with 100 parts by volume of benzene and the mixture dried by azeotropic distillation, with return of solvent to the mixture. The reaction vessel is flushed with dry nitrogen and 0.27 part of sodium methoxide added and the mixture stirred until solution is complete. After cooling to approximately 20° C., there is added, with stirring, 40.1 parts of a methyl hydrogen polysiloxane obtained by cohydrolysis from 8 molar proportions of methyldichlorsilane and 2 molar proportions of trimethylchlorsilane. Hydrogen is evolved and the rate of addition is adjusted so that the hydrogen evolution does not become too vigorous. When addition is complete, the mixture is stirred until the effervescence subsides, and is then heated to the boil and refluxed for about 1½ hours. A test-portion treated with an excess of sodium methoxide shows no further effervescence, indicating that reaction is complete. There is then added 0.54 of a part of ethylene dibromide and refluxing is continued for a further ½ hour. The benzene is now removed by distillation, the last traces being removed under reduced pressure (15 mms. of mercury) and the slightly turbid residue is then filtered, after cooling, with the aid of siliceous earth.

There is thus obtained 98 parts of a fairly mobile colourless oil consisting substantially of a siloxane-oxyalkylene copolymer having the average structure:

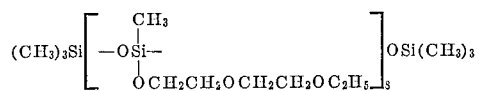

The product is insoluble in water but soluble in polypropylene glycol of molecular weight about 2000 and is useful as a surface-active agent in the fabrication of polyurethane foams.

Example 2

The procedure of Example 1 is repeated using 58.5 parts of N:N-diethylethanolamine in place of the 67 parts of diethylene glycol monoethyl ether. There is obtained a condensate consisting of a faintly yellow oil which is also insoluble in water, although soluble in dilute acetic acid, and which shows a useful combination of certain rigid polyetheractive properties in the fabrication of certain rigid polyether-based polyurethane foams. The product consists essentially of a copolymer having the average structure:

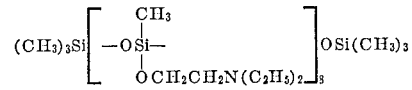

Example 3

A solution of 52.5 parts of a polyethylene glycol monomethyl ether having a molecular weight of 750, in 80 parts by volume of toluene, is dried azeotropically and then allowed to cool with stirring in an atmosphere of nitrogen. To the cooling mixture is added 0.08 of a part of sodium methoxide and then, when the temperature reaches about 50° C., there are added gradually 16.6 parts of a methyl hydrogen polysiloxane derived by cohydrolysis from 3 moles of methyldichlorsilane, 5 moles of dimethyldichlorsilane and 2 moles of trimethylchlorsilane. When addition is complete, stirring is continued until the reaction subsides, and the mixture is then heated to the boil and refluxed for ½ hour. There is then added 0.22 of a part of ethylene dibromide and refluxing is continued for a further 15 minutes. The mixture on cooling is slightly turbid and is filtered with the aid of a siliceous earth. The solvent is removed from the filtrate by distillation under vacuum to leave a residue consisting of a colourless oil which crystallises on cooling to a white waxy solid. The product consists essentially of a siloxane-oxyalkylene graft copolymer having the average structure:

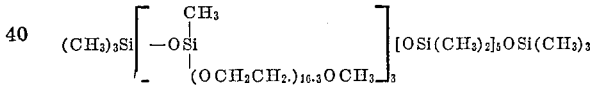

It is completely soluble in cold water and also soluble in polypropylene glycol of molecular weight about 2000. It is a useful surfactant in the fabrication of, for example, rigid polyurethane foams.

In a similar fashion may be made the condensates shown in the following table. Usually an amount of 1–2 moles percent of sodium methoxide for each molar proportion of polyether is sufficient for use as a catalyst but more may be used if the reaction appears to be sluggish. A reflux period of ½ hour after addition of the methyl hydrogen polysiloxane is usually sufficient to complete the reaction, but in exceptional cases, where a test-portion with additional sodium methoxide still shows some effervescence, the reflux period may be prolonged until reaction is complete. The products are all liquids of varying solubilities in water but all are soluble in polypropylene glycol of molecular weight about 2000. They all consist essentially of siloxane-oxyalkylene copolymers having the general structure:

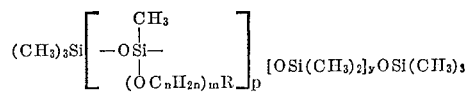

where the values of $p$ and $y$ are determined by the molar proportions of methyldichlorsilane and dimethyldichlorsilane used in cohydroylsis to give the methyl hydrogen polysiloxane starting material, and the grouping $-(OC_nH_{2n})_mR$ is the residue derived from the polyether.

| Methyl Hydrogen Polysiloxane | | | | Polyalkylene Glycol Monoether | | | Characteristics of Product |
|---|---|---|---|---|---|---|---|
| Composition: Cohydrolysis products from | | | Amount Used (parts by weight) | Composition | Molecular Weight | Amount Used (parts by weight) | |
| Methyldi-chlorsilane (moles) | Dimethyldi-chlorsilane (moles) | Trimethyl-chlorsilane (moles) | | | | | |
| 8 | Nil | 2 | 8.03 | Polyethylene glycol monomethyl ether. | 400 | 40.0 | Fairly mobile oil; soluble in cold water. |
| 8 | Nil | 2 | 16.05 | Polyethylene glycol monoalkyl ether (Note 1). | 367 | 75.6 | Slightly viscous oil; emulsifies in water. |
| 3 | 5 | 2 | 35.6 | Polyethylene glycol monomethyl ether. | 365 | 56.4 | Fairly mobile oil; soluble in cold water. |
| 3 | 5 | 2 | 29.7 | Polyethylene glycol monoaryl ether (Note 2). | 586.4 | 73.3 | Fairly viscous syrup; emulsifies in water. |
| 8 | Nil | 2 | 16.05 | Polyalkylene glycol mono-n-butyl ether (Note 3). | 332.7 | 66.5 | Fairly mobile oil; insoluble in water. |
| 3 | 5 | 2 | 23.7 | Polyalkylene glycol monoethyl ether (Note 4). | 1,023 | 105.0 | Slightly viscous oil; soluble in cold water. |
| 3 | 5 | 2 | 29.7 | Polyalkylene glycol mono-n-butyl ether (Note 3). | 332.7 | 42.6 | Mobile oil; insoluble in water. |
| 3 | 15 | 2 | 48.4 | Polyalkylene glycol monoethyl ether (Note 4). | 1,023 | 105.0 | Fairly mobile oil; soluble in cold water. |
| 18 | Nil | 2 | 20.7 | Polypropylene glycol monomethoxyethyl ether. | 354 | 106.2 | Mobile oil; insoluble in water. |
| 3 | 5 | 2 | 23.7 | Polypropylene glycol monomethoxyethyl ether. | 708 | 70.8 | Fairly mobile oil; insoluble in water. |
| 3 | 5 | 2 | 14.2 | Polypropylene glycol monoisooctyl ether (Note 5). | 980 | 58.8 | Do. |
| 18 | Nil | 2 | 20.7 | Polybutylene glycol monoisooctyl ether (Note 6). | 281 | 86.8 | Slightly viscous oil; insoluble in water. |

NOTES:
(1) Obtained by oxyethylating a mixture of cetyl and oleyl alcohols.
(2) Obtained by oxyethylating a commercial octyl cresol.
(3) Obtained by oxyalkylating n-butanol with a mixture of equal parts by weight of ethylene and propylene oxides.
(4) Obtained by oxyalkylating ethylcarbitol with a mixture of ethylene and propylene oxides so as to give a copolymer containing equal parts by weight of oxyethylene and oxypropylene units.
(5) Obtained by oxypropylation of a commercial isooctanol consisting of a mixture of isomers with a commercial butylene oxide also consisting of a mixture of isomers.

Example 4

A mixture of 1410 parts of a polyether obtained by oxyalkylation of a commercial grade of iso-octanol with a mixture of equal parts by weight of ethylene and propylene oxides, so as to give a molecular weight of 1529, and 2100 parts by volume of toluene, is prepared in an atmosphere of nitrogen and then dried by azeotropic distillation. The mixture is cooled from its boiling point to about 105° C. and 7 parts of stannous octoate added, followed by 436 parts of a methyl hydrogen polysiloxane derived from the cohydrolysis of 3 moles of methyldichlorsilane, 15 moles of dimethyldichlorsilane and 2 moles of trimethylchlorsilane. The evolution of hydrogen soon commences. The methyl hydrogen polysiloxane is added gradually with stirring during a period of 2 to 3 hours such that the evolution of hydrogen does not become too vigorous, the temperature being maintained at about 105° C. When addition is complete, the reaction mixture is heated to the boil and refluxed for several hours. A test portion treated with sodium methoxide then shows no further effervescence, indicating that reaction is complete. The solvent is now removed by distillation under vacuum and the slightly turbid liquid residue, after cooling, filtered with the aid of a siliceous earth.

There is thus obtained 1729 parts of a clear, faintly yellow liquid which consists essentially of a siloxane-oxyalkylene copolymer having the average structure:

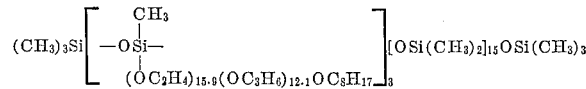

The product is soluble in cold water but shows to a marked degree the properties of inverse solubility as the temperature is raised slightly. It is an outstandingly good surfactant for the preparation of polyurethane foams, especially "one-shot" polyether-based foams.

When the same materials are reacted together using sodium methoxide as catalyst, as described in Example 3, the product consists of two liquid phases, the one in suspension in the other, and is of much more limited solubility in water: it is ineffective as a surfactant for "one-shot" polyether-based polyurethane foams, that is foams prepared by the simultaneous reaction of the foam-forming components in a single stage.

Example 5

A mixture of 1313 parts of a polyether obtained by oxypropylation of a commercial grade of isooctanol so as to give a molecular weight of 390, and 2000 parts by volume of toluene, is prepared in an atmosphere of nitrogen and then dried azeotropically. After cooling to about 80° C. there is then added 7 parts of stannous octoate followed by 227.7 parts of a methyl hydrogen polysiloxane consisting of the cohydrolysis product from 18 molar proportions of methyldichlorsilane and 2 molar proportions of trimethylchlorsilane. The evolution of hydrogen commences within about 1 minute. The methyl hydrogen polysiloxane is added with stirring over about 3 hours, the temperature being raised slowly throughout to about 100° C. When addition is complete, the reaction mixture is heated to the boil and refluxed for several hours. The solvent is removed by distillation under vacuum and the liquid residue filtered, after cooling, with the aid of a siliceous earth.

There is thus obtained 1475 parts of a clear, fairly mobile, oil, which consists essentially of a siloxane-oxyalkylene block copolymer having the average structure:

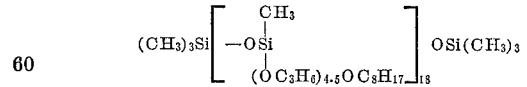

It is insoluble in water although readily soluble in polypropylene glycol of molecular weight about 2000. The product is a valuable surface-active agent for the fabrication of flexible polyurethane foams by both one-shot and prepolymer techniques.

When the same materials are reacted together using sodium methoxide as catalyst, as described in Example 3, a clear condensate is obtained which is also useful as a surfactant for polyurethane foams made by the prepolymer technique, but different batches made by this base-catalysed technique are often very different in the degree of activity displayed. Moreover, even the best of these condensates need to be used in larger amount than similar condensates using stannous octoate as catalyst.

Example 6

The process of Example 4 is repeated using 7 parts of dibutyltin dilaurate as catalyst in place of 7 parts of stannous octoate. There is formed during the condensation a small amount of a grey precipitate which is probably metallic tin, but this is easily removed by filtration after distilling off the solvent. The product is similar to the product of Example 4 and is equally effective as a surfactant for the preparation of polyurethane foams.

Example 7

By the procedure of Example 4 there is prepared a condensate from 70.7 parts of ethylene glycol monophenyl ether and 76 parts of a methyl hydrogen polysiloxane obtained by cohydrolysis of 9 moles of methyldichlorsilane, 9 moles of dimethyldichlorsilane and 2 moles of trimethylchlorsilane. As solvent there is used 140 parts by volume of toluene, and as catalyst 1 part of stannous octoate.

The product is a colourless oil which has a viscosity of 48 centistokes at 25° C. and consists essentially of a copolymer having the average structure:

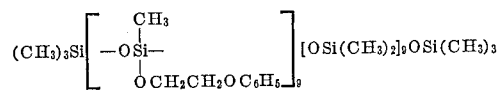

It is insoluble in water although readily soluble in polypropylene glycol of molecular weight about 2000. Its efficiency as a foam stabiliser may be shown by dissolving 0.56 of a part in 40 parts of polypropylene glycol and blowing air through the mixture, when most of the polypropylene glycol is converted into a large volume of stable foam.

Example 8

By the procedure of Example 4 there are prepared the condensates shown in the following table. These are all derived from polyalkylene glycol monoethers obtained by oxyalkylation of the monohydric alcohols shown with mixtures of ethylene and propylene oxides in the given proportions. The products are all liquids of varying viscosities and all are useful surfactants for the preparation of polyurethane foams especially "one-shot" polyether based foams.

Silicone Additive A is a product having substantially the average formula

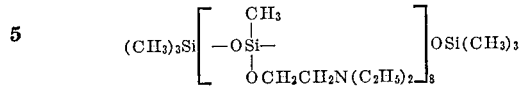

obtained by reaction of a methyl hydrogen polysiloxane with N:N-diethylethanolamine in presence of catalytic amounts of sodium methoxide.

The 4:4'-diisocyanato-3-methyl-diphenylmethane is a composition prepared by phosgenating crude 4:4'-diamino-3-methyl-diphenylmethane, containing approximately 15% of polyamines (mainly triamines), and obtained by condensing aniline, o-toluidine and formaldehyde in the molecular proportions 3.3:1.1:1.0, in presence of hydrochloric acid.

Example 10

70 parts of a polyether triol of molecular weight 3000 prepared by the addition of propylene oxide to glycerol, 1.85 parts of water, 0.5 part of dibutyltindilaurate, 0.3 part of N-methylmorpholine and 0.6 part of Silicone Additive B are intimately mixed. 25.9 parts of an 80/20 mixture of the 2:4- and 2:6-isomers of tolylene diisocyanate are added and stirred in rapidly for 6 seconds after which the mixture is poured into a mould and allowed to stand at room temperature. The low density foam, later removed from the mould was notable for its fine pore-structure and high resilience.

Silicone Additive B is a product having substantially the average formula

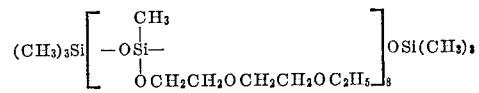

obtained by reaction of a methyl hydrogen polysiloxane with diethylene glycol monoethyl ether in presence of catalytic amounts of sodium methoxide.

| Methyl Hydrogen Polysiloxane | | Polyalkylene Glycol Monoether | | | | Solvent (parts by volume of toluene) | Catalyst (parts by weight of stannous octoate) | Viscosity of Product (at 25° C.) |
|---|---|---|---|---|---|---|---|---|
| | | Composition | | | | | | |
| Product Used | Amount Used (parts by weight) | Monohydric alcohol Initiator | Ethylene oxide/ Propylene oxide Weight Ratio | Molecular Weight | Amount Used (parts by weight) | | | |
| Silicone I | 84.3 | n-Butanol | 1:1 | 1,440 | 221.0 | 333 | 1.50 | 936 centistokes. |
| Do | 84.3 | Diethylene glycol monoethyl ether. | 1:1 | 1,023 | 156.5 | 230 | 1.20 | 826.4 centistokes. |
| Do | 56.2 | Iso-octanol | 1:1 | 1,987 | 202.7 | 300 | 1.25 | 15.57 poises. |
| Do | 112.4 | do | 1:2 | 1,481 | 302.0 | 450 | 2.00 | 9.08 poises. |
| Silicone II | 76.0 | n-Butanol | 1:1 | 696 | 356.0 | 550 | 2.00 | 181.6 centistokes. |

Silicone I is a cohydrolysis product from approximately 3 moles of methyldichlorsilane, 15 moles of dimethyldichlorsilane and 2 moles of trimethylchlorsilane and has an active hydrogen content of 0.178%.
Silicone II is a cohydrolysis product from approximately 9 moles of methyldichlorsilane, 9 moles of dimethldichlorsilane and 2 moles of trimethylchlorsilane and has an active hydrogen content of 0.59%.

Example 9

50 parts of an oxypropylated trimethylolpropane of molecular weight 300, 2 parts of water and 1 part of Silicone Additive A are thoroughly mixed until homogeneous. This mixture is then added to 100 parts of a 4:4'-diisocyanato-3-methyldiphenylmethane composition and the whole blended together within 10 seconds and then poured into a mould. Foaming rapidly occurs to produce an extremely fine-textured rigid foam.

Example 11

100 parts of an oxypropylated glycerol of molecular weight 3000 is blended with 38 parts of an 80:20 mixture of tolylene 2:4- and 2:6-diisocyanates and a mixture containing 3 parts of water, 0.3 of a part of 1:4-diazabicyclo-[2.2.2]octane, 0.5 of a part of N-methyl morpholine, 0.05 of a part of dibutyl tin dilaurate and 1 part of Silicone Additive C. The whole mixture is then transferred to a mould and in thirty minutes there is obtained a resilient cellular product having a specific gravity of 0.032 g./cc.

Silicone Additive C is a product having substantially the average formula

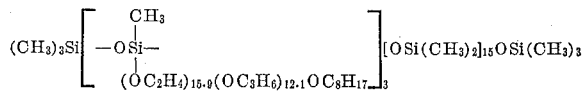

obtained by reacting (a) a methyl hydrogen polysiloxane derived from the cohydrolysis of 3 moles of methyldichlorsilane, 15 moles of dimethyldichlorsilane, and 2 moles of trimethylchlorsilane, with (b) a polyether of molecular weight 1529 obtained by oxyalkylation of a commercial grade of isooctanol with a mixture of equal parts by weight of ethylene and propylene oxides, in presence of stannous octoate as catalyst.

Example 12

400 parts of an oxypropylated glycerol of molecular weight 3000 and hydroxyl value of 56 are heated to 40° C. and mixed with 11.6 parts of water. To this mixture is immediately added 2 parts of stannous octoate and a mixture of 4 parts of Silicone Additive D and 152 parts of an 80:20 mixture of tolylene 2:4- and tolylene 2:6-diisocyanates, with vigorous stirring. When foaming commences, the mixture is poured into a mould when a low density flexible foam having a very fine pore structure is rapidly obtained.

Silicone Additive D is a product having substantially the average formula

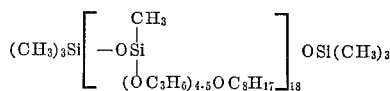

made by reacting a methyl hydrogen polysiloxane, with a polyether of molecular weight 390 obtained by oxypropylating a commercial grade of iso-octanol, in presence of catalytic amounts of stannous octoate.

Example 13

A prepolymer, obtanied by mixing together 100 parts of polypropylene glycol of molecular weight 2000, 57 parts of an 80:20 mixture of tolylene 2:4- and 2:6-diisocyanates, and 0.25 of a part of N:N-dimethylbenzylamine, is blended with 0.35 of a part of N:N-dimethylcyclohexylamine, 0.3 of a part of Silicone Additive D, 3.1 parts of water and 0.31 of a part of an octylphenol ethylene oxide condensate. The mixture is poured into a mould. After 15 minutes there is obtained a resilient cellular product having a specific gravity of 0.022 g./cc.

Example 14

(a) Into 100 parts of the liquid polymer prepared by reacting 242 parts of pentaerythritol and 630 parts of 1:3-butylene glycol with 876 parts of adipic acid and 148 parts of phthalic anhydride and having an acid value of 6.8 mgs. KOH/g., a hydroxyl value of 221 mgs. KOH/g. and a viscosity of 25° C. of 503 poises, are mixed 4 parts of water, 15 parts of tri-β-chloroethyl phosphate and 10 parts of a 66% aqueous solution of dimethyl benzylamine lactate.

(b) Into 200 parts of a diphenylmethane diisocyanate composition are dispersed 2 parts of Silicone Additive C.

(c) 182 parts of mixture (b) are added to all of mixture (a) and the whole is vigorously stirred for 1¼ minutes, when it is passed into a mould, and foams to give a fine cellular rigid product of density 2.0 lb./cu. ft.

The diphenylmethane diisocyanate composition used in this example is prepared by phosgenating a crude diaminodiphenylmethane, containing about 15% of polyamines (mainly triamines) obtained by condensing formaldehyde with aniline in the presence of hydrochloric acid.

Example 15

Into 100 parts of the liquid polyether prepared by the reaction of 1193 parts of propylene oxide with 750 parts of trimethylolpropane and having a hydroxyl value of 479 mgs. KOH/g., a molecular weight of 354 and a viscosity of 1152 centistokes at 25° C., are mixed 4 parts of water, 15 parts of tri-β-chloroethyl phosphate and 10 parts of a 66% aqueous solution of dimethylbenzylamine lactate.

(b) 3.0 parts of Silicone Additive C are dispersed into 300 parts of the diphenylmethane diisocyanate composition of Example 14.

(c) 272 parts of mixture (b) are added to all of mixture (a) and the whole is given a thorough whisking stir for 1 minute, when the mix is poured into a mould where it foams rapidly to give a rigid foam of uniform even texture, and density 1.5 lb./cubic foot.

Example 16

(a) Into 100 parts of the liquid polyester of Example 14 are mixed 4 parts water, 10 parts of a 66% aqueous solution of dimethylbenzylamine lactate and 15 parts of tri-β-chloroethyl phosphate.

(b) Into 270 parts of the diphenylmethane diisocyanate composition of Example 14 are dissolved and dispersed 1.5 parts of Silicone Additive E.

(c) 181 parts of mixture (b) are mixed vigorously into the whole of mixture (a) for 1¼ minutes when foaming occurs, and a cellular rigid structure of density 2.3 lbs./cu. ft. is formed.

Silicone Additive E is a product having substantially the average structure

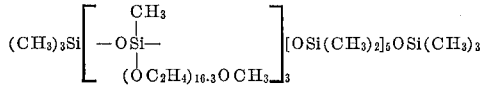

Example 17

100 parts of a branched polyester obtained from the reaction of 7 molar proportions of trimethylolpropane and 3 molar proportions of adipic acid and having a hydroxyl value of 650 and an acid value of 3, 55 parts of trichlorofluoromethane and 2 parts of N:N-dimethylcyclohexylamine are mixed together with a basket type stirrer for 15 seconds. There is then added 160 parts of the isocyanate composition of Example 14 in which has been dispersed 2 parts of Silicone Additive C, and the whole is then stirred for a further 15 seconds and poured into a mould. There is thus obtained a fine-textured rigid foam having a density of 2.63 lb./cu. ft.

Without the silicone there is much loss of gas and there is obtained a coarse honeycomb structure which is extremely brittle and of a higher density.

What we claim is:

1. A process for the manufacture of cellular polyurethane foams by the reaction of a hydroxyl group-containing polymer containing at least two isocyanate-reactive groups per molecule and an organic polyisocyanate in the presence of a blowing agent selected from the group consisting of water, a low boiling point liquid chemically inert to water and isocyanate and having a boiling point not exceeding 75° C. and mixtures thereof, the reaction mixture containing a siloxane-oxyalkylene copolymer of the general formula:

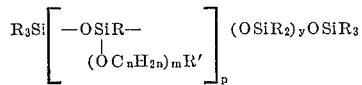

wherein R is a monovalent hydrocarbon radical, R′ is a radical derived from a compound R′H wherein H is a hydrogen atom reactive with a cyclic oxide, said radical R′ being selected from the group consisting of alkoxy, aryloxy, amino, acyloxy and amido, $n$ is an integer of 2 to 4, $m$ and $p$ are positive integers of at least 1, and $y$ is selected from positive integers and zero.

2. A process for the manufacture of cellular polyurethane foams as set forth in claim 1 wherein the hydroxyl group containing polymer is a polyether and all the reactants are mixed together substantially simultaneously.

3. A process for the manufacture of cellular polyurethane foams as set forth in claim 2 wherein the polyether is a predominantly secondary hydroxyl-ended member of the group consisting of polymers of propylene oxide.

4. A process for the manufacture of cellular polyurethane foams as set forth in claim 1 in which the siloxane-oxyalkylene copolymer is incorporated in an amount of from 0.1% to 5% by weight of the weight of hydroxyl-group containing polymer.

5. A process for the manufacture of cellular polyurethane foams as set forth in claim 4 in which the siloxane-oxyalkylene copolymer is incorporated in an amount of from 0.3 to 1% by weight of the hydroxyl-group containing polymer.

6. A process for the manufacture of cellular polyurethane foams as set forth in claim 1 in which the reaction is carried out in the presence of a catalyst.

7. A process for the manufacture of cellular polyurethane foams as set forth in claim 1 in which said blowing agent is water.

8. A process for the manufacture of cellular polyurethane foams as set forth in claim 1 in which R' is an alkoxy group and $m$ has a value of at least 2.

9. A process for the manufacture of cellular polyurethane foams as set forth in claim 8 in which the alkoxy group is the residue of a polyether obtained by oxyalkylation of a monohydric alcohol.

10. A process for the manufacture of cellular polyurethane foams as set forth in claim 1 in which R is methyl.

11. A process for the manufacture of cellular polyurethane foams as set forth in claim 1 in which R is methyl, R' is an alkoxy group, $m$ is at least 2, and $n$ is 3.

12. A process as claimed in claim 1 wherein, in said siloxane-oxyalkylene copolymer, R represents methyl, $n$ in part represents 2 and in part represents 3 and R' represents an isooctyloxy radical.

References Cited by the Examiner

UNITED STATES PATENTS

| | | | |
|---|---|---|---|
| 2,834,748 | 5/1958 | Bailey et al. | 260—42 |
| 2,909,549 | 10/1959 | Bailey | 260—448.8 |
| 2,967,171 | 1/1961 | Barnes | 260—448.8 XR |
| 3,040,080 | 6/1962 | Kopnick et al. | 260—448.8 |
| 3,054,759 | 9/1962 | Britain | 260—2.5 |
| 3,055,854 | 9/1962 | Merten | 260—2.5 |

FOREIGN PATENTS 1,212,252  10/1959  France.

LEON J. BERCOVITZ, *Primary Examiner.*

D. E. CZAJA, *Assistant Examiner.*